(12) United States Patent
Waldorf et al.

(10) Patent No.: US 7,284,018 B1
(45) Date of Patent: Oct. 16, 2007

(54) LOGLESS TRANSACTION COORDINATION

(75) Inventors: Jerry A. Waldorf, Woodland Hills, CA (US); Venugopalan Venkataraman, Diamond Bar, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 454 days.

(21) Appl. No.: 10/923,528

(22) Filed: Aug. 20, 2004

Related U.S. Application Data

(60) Provisional application No. 60/511,817, filed on Oct. 15, 2003.

(51) Int. Cl.
*G06F 12/00* (2006.01)

(52) U.S. Cl. .................... 707/200; 707/104.1

(58) Field of Classification Search ......... 707/1–104.1, 707/200
See application file for complete search history.

(56) References Cited

U.S. PATENT DOCUMENTS

| | | | |
|---|---|---|---|
| 5,530,855 A * | 6/1996 | Satoh et al. ................. | 707/201 |
| 5,909,540 A * | 6/1999 | Carter et al. ................. | 714/4 |
| 6,081,592 A * | 6/2000 | Battle ........................ | 379/309 |
| 6,144,999 A * | 11/2000 | Khalidi et al. .............. | 709/219 |
| 6,163,856 A * | 12/2000 | Dion et al. ................... | 714/4 |
| 6,385,450 B1 * | 5/2002 | Watanabe .................. | 455/436 |
| 6,728,879 B1 * | 4/2004 | Atkinson .................... | 713/168 |
| 6,892,204 B2 * | 5/2005 | Haas et al. ................. | 707/100 |
| 7,111,016 B2 * | 9/2006 | Gurevich ............... | 707/103 R |
| 7,228,351 B2 * | 6/2007 | Arwe ....................... | 709/226 |

* cited by examiner

*Primary Examiner*—Don Wong
*Assistant Examiner*—Linh Black
(74) *Attorney, Agent, or Firm*—Hickman Palermo Truong & Becker LLP

(57) ABSTRACT

Methods and apparatus, including computer program products, implementing and using techniques for performing a transaction across one or more resources. A connection is established to one or more resources that are required by a transaction. Each connected resource is registered with a transaction manager. One of the resources is designated as an anchor resource. The one or more resources are updated in accordance with the transaction; and a two-phase commit with each resource involved in the transaction is performed, wherein the anchor resource is committed to after every other resource has been committed to. Methods and apparatus, including computer program products, implementing and using techniques for recovering one or more interrupted transactions across one or more resources are also described.

20 Claims, 3 Drawing Sheets

LOGLESS TRANSACTION COORDINATION

CROSS-REFERENCE TO RELATED APPLICATIONS

This application claims the benefit of U.S. Provisional Application Ser. No. 60/511,817, filed on Oct. 15, 2003, which is incorporated by reference herein.

BACKGROUND

This invention relates to distributed transaction processing.

Enterprise applications often require simultaneous access to distributed data that is shared among multiple resources, such as databases and servers. In order to maintain the integrity of data in a distributed system, an enterprise application typically treats all the distributed resources as a single unit of work. That is, all the participating operations on the distributed resources succeed, or fail and recover, together. One way to achieve maintenance of data integrity in a distributed system is to use transaction processing in the system.

Transaction processing can be described as a type of computer processing in which a computer responds to requests on an immediate basis. Each request is a transaction. Most large enterprise applications in the areas of financing, banking, electronic commerce, and so on, rely on transaction processing for delivering their business functionality. A transaction can be described to be atomic, consistent, isolated, and durable, (the "ACID properties"). Atomic transactions are done or undone completely and unambiguously. Consistent transactions preserve all invariant properties defined on associated data. Upon completion of a successful transaction, the associated data is in a consistent state. Isolated transactions execute independently of other transactions that may be executing in the same environment. Durable transactions have effects that are always persistent.

A variety of different transaction processing models exist. The X/Open Distributed Transaction Processing (DTP) model is a distributed transaction processing model proposed by the Open Group—a vendor consortium. The X/Open DTP model is a standard among most of the commercial vendors in the transaction processing and database domains. Some of the other models include: the Object Transaction Service (OTS)—a distributed transaction processing service specified by the Object Management Group (OMG); the Java Transaction Service (JTS) and the Java Transaction API (JTA), specified by Sun Microsystems Inc.; the Microsoft Transaction Server (MTS)—a component based transaction server for components based on Microsoft's Component Object Model (COM); and Enterprise Java Beans (EJB)—a technology specification from Sun Microsystems Inc. that specifies a framework for building component-based distributed applications.

SUMMARY

In general, in one aspect, the invention features methods and apparatus, including computer program products, implementing and using techniques for performing a transaction across one or more resources. A connection is established to one or more resources that are required by a transaction. Each connected resource is registered with a transaction manager. One of the resources is designated as an anchor resource. The one or more resources are updated in accordance with the transaction; and a two-phase commit with each resource involved in the transaction is performed, wherein the anchor resource is committed to after every other resource has been committed to.

Advantageous implementations of the invention include one or more of the following features. An application signal indicating the start of a transaction can be received. An application signal indicating the end of a transaction can be received. Performing a two-phase commit can include signaling a prepare message to each updated resource, wherein the anchor resource is signaled to last; and signaling a commit message to each updated resource, wherein the anchor resource is signaled to last. The anchor resource can be checked regarding whether any more transactions need to be performed, and if there are more transactions to be performed, the establishing, registering, designating, updating and performing steps can be repeated for each of the remaining transactions. A transaction identifier can be assigned to the transaction. The transaction identifier can include one or more of: a transaction manager identifier, an anchor resource identifier or a transaction unique identifier.

In general, in another aspect, the invention features methods and apparatus, including computer program products, implementing and using techniques for recovering one or more interrupted transactions across one or more resources. A connection is established to one or more resources that were required by one or more interrupted transactions. A list of prepared but not committed transactions is received from each resource. For each transaction in the received list of transactions, whether the transaction exists in an anchor database associated with an anchor resource is determined. If the transaction exists in the anchor database, the transaction is committed and if the transaction does not exist in the anchor database, the transaction is canceled.

The invention can be implemented to realize one or more of the following advantages. The status of coordinated transactions can be efficiently recorded, so that upon recovery of an interrupted (e.g., crashed) system, any transactions in question can be completed or rolled-back (e.g., cancelled), as appropriate. A separate Transaction Log (for recording Transaction Identifiers (XIDs) that have been successfully "prepared" with all resources that the transaction spans) is not needed. Log replacement is assigned to an Anchor Resource for each transaction. The number of storage media "writes" necessary in order to complete a transaction can thereby be reduced by one for each transaction. Only the resources that are updated need to be written to. Since each update requires storage of the transaction identifier to correlate the update with other updates that belong to the same transaction, no additional or unnecessary updates are introduced. All the information that is needed for completion of a partially committed transaction is stored within each transaction identifier, and can thus be derived from the transaction identifier.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
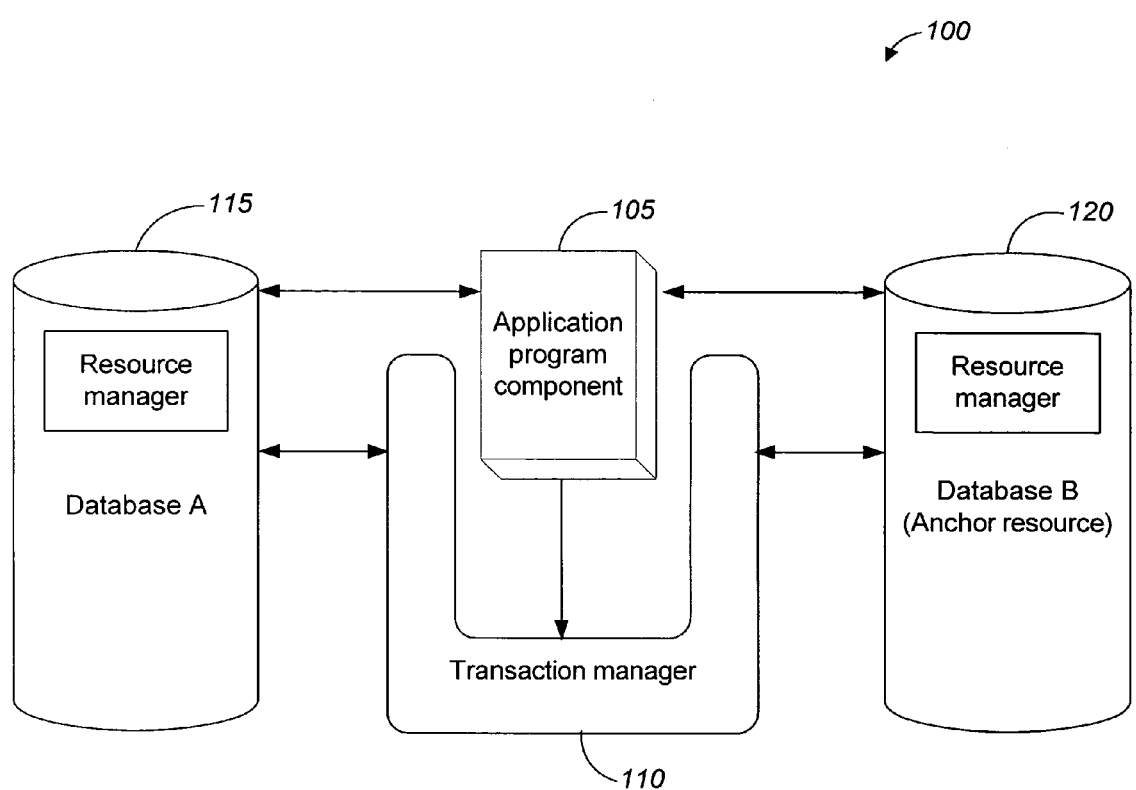
FIG. 1 is a schematic diagram showing a distributed transaction system.

As can be seen in FIG. 1, a distributed transaction processing (DTP) system (100) includes an application program component (105), a transaction manager (110), and two resource managers, which in FIG. 1 are represented by databases A and B (115, 120). Database B (120) is designated as an anchor resource, which will be explained in further detail below. The arrows indicate the general direction in which information flows between the system components. The invention will be described herein as an implementation using the X/Open DTP model. It should, however, be clear that many other distributed transaction process models can be used, and the X/Open DTP implementation described herein is in no way intended to limit the invention as defined in the claims. The X/Open DTP specification is described in "Distributed Transaction Processing The XA Specification," by The Open Group, UK ISBN 1-872630-24-3, February 1992, which is hereby incorporated by reference in its entirety.

The application program component (105) defines transactions and accesses resources within the transaction's boundaries. The application program component (105) specifies a sequence of operations that involves resources such as terminals and databases (115, 120). The term application program component is used in this specification to refer to a single instance of an application program.

The resource managers, for example, databases (115, 120), manage certain parts of a computer's shared resources. Many other software entities can request access to a resource from time to time, using services that the resource manager provides. In the implementation shown in FIG. 1, the resource managers are shown as databases (115, 120). Other examples of resource managers can include file access methods, such as the Indexed Sequential Access Method (ISAM), and print servers that can be implemented as resource managers. A single resource manager can service multiple independent resource domains. A resource manager instance services one domain. Unless specified otherwise, operations that are allowed on a resource manager are allowed on each resource manager instance.

The resource managers (115, 120) in the DTP environment support transactions, as described in the background section above. Typically, the resource managers (115, 120) structure work into recoverable units. In the DTP environment, several resource managers (115, 120) operate in support of the same unit of work. The unit of work is a transaction. For example, the application program component (105) can request updates to both databases (115,120). Work occurring anywhere in the system (100) must be committed to atomically. Each resource manager (115, 120) relies on the transaction manager (110) to coordinate the resource manager's (115, 120) recoverable units of work that are part of a transaction.

Commitment of a resource manager's (115, 120) internal work depends not only on whether the resource manager's own operations can succeed, but also on operations occurring at other resource managers (115, 120), which may be remote. If an operation fails somewhere, every participating resource manager (115, 120) must roll back (i.e., cancel) all operations that the resource manager performed on behalf of the transaction. A particular resource manager (115, 120) is typically unaware of the work of other resource managers (115, 120). The transaction manager (110) therefore informs each resource manager (115, 120) of the existence, and directs the completion, of transactions. The resource manager (115, 120) is responsible for mapping the recoverable units of work to the transaction.

The transaction manager (110) manages transactions, coordinates the decision to commit the transactions or to roll the transactions back (i.e. cancel the transactions), and coordinates failure recovery. How the tasks are accomplished will be described in detail below with reference to FIGS. 2 and 3. Generally speaking, the application program component (105) defines the start and end of a transaction by calling the transaction manager (110). The transaction manager (110) assigns an identifier to the transaction. The transaction manager (110) manages transactions and informs each resource manager (115, 120) of the transaction identifier (XID) on behalf of which the resource manager (115, 120) works. Although resource managers have the ability to independently manage recoverable work units, each resource manager must accept XIDs and associate the XIDs with the work units. A resource manager can thereby determine what recoverable work units to complete when the transaction manager completes a transaction.

A transaction has one or more transaction branches. A transaction branch is a part of the work in support of a transaction for which the transaction manager (110) and the resource manager (115, 120) engage in a separate but coordinated transaction commitment protocol. Each of the resource manager's (115, 120) internal units of work in support of a transaction is part of exactly one branch. A transaction might have more than one branch when, for example, the application program component (105) uses multiple processes, or is involved in the same transaction, by multiple remote application program components (105).

After the transaction manager (110) begins the transaction commitment protocol, the resource managers (115, 120) receive no additional work to do on that transaction branch. The resource managers (115, 120) can receive additional work on behalf of the same transaction, but from different branches. The different branches are related in that the transaction branches must be completed atomically. As will be seen below, each transaction branch identifier (XID) that the transaction manager (110) provides to the resource manager (115, 120) includes an identification of a transaction and of a specific branch. The resource manager (115, 120) can use this information to optimize the use of shared resources and locks.

Figure 2:
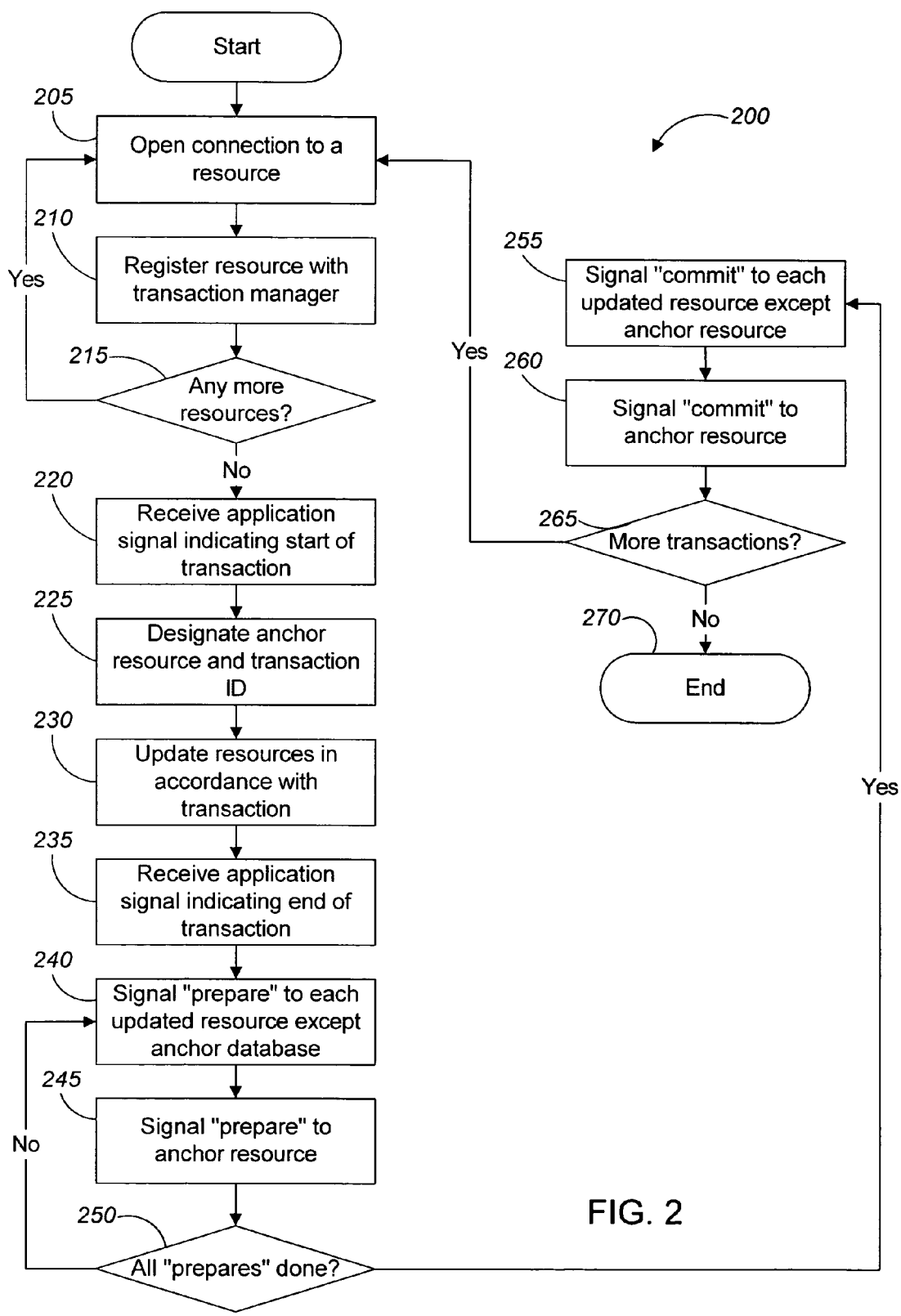
FIG. 2 is a flowchart showing a process for updating resources in a distributed transaction system.

The conventional operation of the system (100) of FIG. 1 will now be explained with reference to FIG. 2. In the example presented in FIG. 2, only two resources are coordinated. The processes described below are generalized to cover any number of resources participating in the transaction. As can be seen in FIG. 2, a process (200) for updating resources in a distributed transaction system starts by establishing a connection to the first resource or database (step 205). The resource is registered with the transaction manager (step 210). The process then checks whether there are any more resources that will take part in the transaction (step 215). If there are more resources, the process (200) returns to step 205 and proceeds as described above. If there are no more resources, then the process (200) continues by receiving a signal from the application program component (105) that indicates the start of a transaction (step 220).

In response, the transaction manager (110) designates one of the resources to be an anchor resource (120). The anchor resource (120) is chosen to be one of the resources that are being updated during the transaction. Resources that can only be read from, and thus not updated, cannot be selected as anchor resources, since these resources cannot be used to store any transaction identifiers, as will be explained below. The transaction manager assigns a transaction identifier (XID) to the transaction (step 225). In one implementation, the XID is specified as follows:

*XID*=Transaction Manager *ID*+Anchor Resource *ID*+Transaction Unique *ID* where "+" indicates a concatenation operator. The anchor resource's identifier is a unique number, and by including the anchor resource's identifier in the XID, the anchor resource can always be identified for a particular transaction.

The process then updates each resource, as required by the transaction (step 230). In some cases, the order in which the updates are made is irrelevant, but in other cases the order matters, depending on the application logic that is used. When all updates have been made, the application program component signals the end of the transaction to the transaction manager (step 235). The transaction manager then signals the first phase of a two-phase commit ("prepare") to each resource that was updated, except the anchor resource (step 240), which is prepared last (step 245).

In the implementation described herein, the transaction manager (110) and resource managers (115, 120) use two-phase commit with presumed rollback, as defined by the DTP specification. During the first phase, the transaction manager (110) asks all resource managers (115, 120) to prepare transaction branches to be committed, that is, whether each resource manager (115, 120) can guarantee commitment of the transaction branch. A resource manager (115, 120) may in turn have to query other entities internal to the resource manager (115, 120). If a resource manager (115, 120) can commit the work, the resource manager records stably the information needed for the commitment, and then replies affirmatively. A negative reply reports failure for any reason. The transaction manager (110) rolls back the transaction if any resource manager (115, 120) responds negatively to the request during the first phase, or if the application program component (105) directs the transaction manager (110) to roll back the transaction. A negative response concludes the resource manager's (115, 120) involvement in the transaction.

Returning to FIG. 2, the process then checks whether all the necessary "prepares" have been done (step 250). If there are still additional "prepares" to be made, the process returns to step 240 and performs steps 240 and 245 as was discussed above. If all "prepares" are completed, the transaction manager signals "commit" to each resource except the anchor resource (step 255) and then finally to the anchor resource (260), such that the anchor resource is committed last. During the second phase of the two-phase commit, the transaction manager (110) issues a request to all resource managers (115, 120) to commit or roll back the transaction branch, as the case may be. Before issuing requests to commit, the transaction manager (110) stably records the decision to commit, as well as a list of all involved resource managers (115, 120). Finally, the resource managers (115, 120) commit or roll back changes to shared resources and then return status to the transaction manager (110). The transaction manager (110) can then discard the knowledge of the transaction. In a rollback situation, the transaction manager (110) effects the second phase by telling all resource managers (115, 120) to roll back transaction branches. In a rollback, the resource managers (115, 120) must not let any changes to shared resources become permanent. During the second phase, the transaction manager (110) does not issue the requests to resource managers (115, 120) that responded negatively during the first phase. The transaction manager (110) does not need to record stably the decision to roll back nor the participants in a rolled back transaction.

After all the resources (115, 120) have been committed or rolled back, the process checks whether there are any more transactions (step 265). If there are additional transactions, the process returns to step 205, and performs the steps as described above. If there are no more transactions to be performed, the process is completed (step 270).

Figure 3:
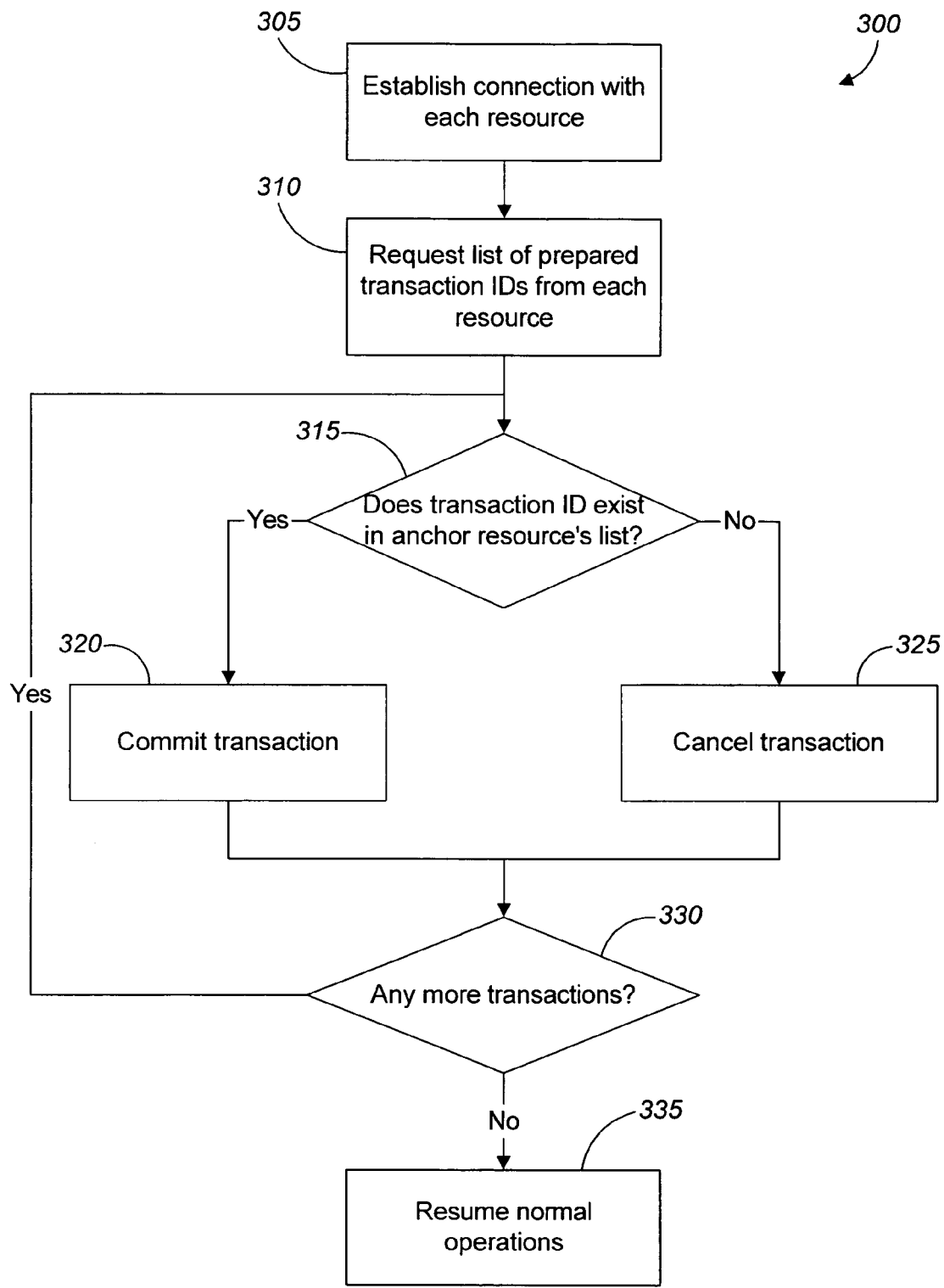
FIG. 3 is a flowchart showing a process for recovering one or more interrupted transactions in a distributed transaction system.

There may be situations in which there for some reason has been an interruption of the transaction and the transaction has to be restarted. In such a situation, some resources, but not others, may have been prepared. FIG. 3 shows a process (300) executed by the transaction manager (110) for recovering one or more interrupted transactions in a distributed transaction system (100), in order to bring the resources (115, 120) back into synchronization. As can be seen in FIG. 3, the process (300) starts with establishing a connection with each resource under its control (step 305). The process requests "in doubt" transaction identifiers from each resource (115, 120) (step 310). Here, an "in doubt" transaction means a transaction that has been prepared, but not committed, that is, transactions that have only completed the first phase of the two-phase commit process described above. Each resource keeps a transaction log that includes the status of all transactions involving that particular resource. When the process (300) requests the list of "in doubt" transactions, each resource shares its own transaction log with the transaction manager, which generates a compiled list of "in doubt" transactions for all the resources.

The process then checks the XID for each "in doubt" transaction in the compiled list against the list of transactions in the anchor resource (step 315). If the XID also appears in the anchor resource's list, which indicates that the transaction has been prepared on every resource (since the anchor resource was the last resource to be prepared). The process then instructs the resource manager to commit the transaction (step 320). However, if the XID does not appear in the anchor resource's "in doubt" list, the transaction has not been successfully prepared across all resources, and the resource manager is instructed to "roll back" (cancel) the transaction (step 325). The process then checks whether there are any more transactions to be committed or canceled (step 330). If there are more transactions, the process continues to step 315, and repeats steps 315-330 as described above. If there are no more transactions, the process resumes normal operations (step 335), as was described above with reference to FIG. 2.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. The anchor identifier does not have to be encoded as part of the Transaction Identifier (XID). Instead, the anchor identifier can be stored in a different location, for example, be appended to the application data that is stored. The methods of the transaction manager can be implemented within the application itself, so that the transaction manager in effect is embedded within the application that requires the transaction manager rather than implementing it as a separate computer program. The invention has been described in an X/Open environment, as specified in the X/Open XA specification referred to above. The XA interface is used between the transaction manager and resource managers. However, XA need not be used if a different interface is chosen, and that interface implements a two-phase commit protocol.

What is claimed is:

1. A method for performing a transaction across a plurality of resources, comprising:
   establishing a connection to each of a plurality of resources that are involved in a transaction;
   registering each of the plurality of resources with a transaction manager;
   designating one of the plurality of resources as an anchor resource;
   updating at least some of the plurality of resources, including the anchor resource, in accordance with the transaction; and
   performing a two-phase commit with each of the plurality of resources that has been updated to render the updates made to those resources persistent, thereby, completing the transaction, wherein the anchor resource is committed to after every other resource in the plurality of resources that has been updated has been committed to.

2. The method of claim 1, further comprising:
   receiving an application signal indicating the start of a transaction.

3. The method of claim 1, further comprising:
   receiving an application signal indicating the end of a transaction.

4. The method of claim 1, wherein performing a two-phase commit includes:
   signaling a prepare message to each of the plurality of resources that has been updated, wherein the anchor resource is signaled to last; and
   signaling a commit message to each of the plurality of resources that has been updated, wherein the anchor resource is signaled to last.

5. The method of claim 1, further comprising:
   checking if any more transactions need to be performed; and
   if there are more transactions to be performed, repeating the establishing, registering, designating, updating and performing steps for each of the remaining transactions.

6. The method of claim 1, further comprising:
   assigning a transaction identifier to the transaction; and
   storing the transaction identifier in at least the anchor node.

7. The method of claim 1, wherein the transaction identifier includes one or more of: a transaction manager identifier, an anchor resource identifier and a transaction unique identifier.

8. A method for recovering one or more interrupted transactions across a plurality of resources, comprising:
   establishing a connection to each of a plurality of resources that were involved in one or more interrupted transactions;
   receiving a list of prepared but not committed transactions from each resource;

for each transaction in the received list of transactions, determining whether the transaction exists in an anchor database associated with an anchor resource;

if the transaction exists in the anchor database, committing the transaction, thereby completing the transaction; and if the transaction does not exist in the anchor database, canceling the transaction.

9. The method of claim 8, wherein:

each transaction has a transaction identifier that uniquely identifies the transaction.

10. The method of claim 9 wherein:

the transaction identifier includes one or more of: a transaction manager identifier, an anchor resource identifier and a transaction unique identifier.

11. A computer program product, comprising instructions for causing one or more processors to:

establish a connection to each of a plurality of resources that are involved in a transaction;

register each of the plurality of resources with a transaction manager;

designate one of the plurality of resources as an anchor resource;

update at least some of the plurality of resources, including the anchor resource, in accordance with the transaction; and perform a two-phase commit with each of the plurality of resources that has been updated to render the updates made to those resources persistent, thereby completing the transaction, wherein the anchor resource is committed to after every other resource in the plurality of resources that has been updated has been committed to.

12. The computer program product of claim 11, further comprising instructions for causing one or more processors to: receive an application signal indicating the start of a transaction.

13. The computer program product of claim 11, further comprising instructions for causing one or more processors to: receive an application signal indicating the end of a transaction.

14. The computer program product of claim 11, wherein the instructions for causing the one or more processors to perform a two-phase commit cause the one or more processors to:

signal a prepare message to each of the plurality of resources that has been updated, wherein the anchor resource is signaled to last; and signal a commit message to each of the plurality of resources that has been updated, wherein the anchor resource is signaled to last.

15. The computer program product of claim 11, further comprising instructions for causing one or more processors to: check if any more transactions need to be performed; and if there are more transactions to be performed, repeat establish, register, designate, update, and perform operations for each of the remaining transactions.

16. The computer program product of claim 11, further comprising instructions for causing one or more processors to:

assign a transaction identifier to the transaction; and store the transaction identifier in at least the anchor resource.

17. The computer program product of claim 11, wherein:

the transaction identifier includes one or more of: a transaction manager identifier, an anchor resource identifier and a transaction unique identifier.

18. A computer program product, comprising instructions for causing one or more processors to:

establish a connection to each of a plurality of resources that were involved in one or more interrupted transactions;

receive a list of prepared but not committed transactions from each resource;

for each transaction in the received list of transactions, determine whether the transaction exists in an anchor database associated with an anchor resource;

if the transaction exists in the anchor database, commit the transaction, thereby completing the transaction; and if the transaction does not exist in the anchor database, cancel the transaction.

19. The computer program product of claim 18, wherein:

each transaction has a transaction identifier that uniquely identifies the transaction.

20. The computer program product of claim 19 wherein:

the transaction identifier includes one or more of: a transaction manager identifier, an anchor resource identifier and a transaction unique identifier.

* * * * *